(12) United States Patent
Chen

(10) Patent No.: US 8,244,137 B1
(45) Date of Patent: Aug. 14, 2012

(54) MULTICHANNEL ON A SINGLE WAVE LASER OVER WAVE DIVISION MULTIPLEXING IN FREE SPACE OPTICS USING PHASE MASKS

(75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 517 days.

(21) Appl. No.: 12/495,571

(22) Filed: Jun. 30, 2009

(51) Int. Cl.
*H04B 10/00* (2006.01)
(52) U.S. Cl. .......................................... 398/130; 398/118
(58) Field of Classification Search ........... 398/118–131
See application file for complete search history.

(56) References Cited

U.S. PATENT DOCUMENTS

| | | | | |
|---|---|---|---|---|
| 3,873,825 A * | 3/1975 | Jones et al. | ...................... | 398/86 |
| 3,875,400 A * | 4/1975 | Pao et al. | ...................... | 398/131 |
| 4,635,299 A * | 1/1987 | MacGovern | .................. | 398/129 |
| 4,655,547 A * | 4/1987 | Heritage et al. | .............. | 359/563 |
| 4,866,699 A * | 9/1989 | Brackett et al. | ................. | 398/78 |
| 4,959,863 A * | 9/1990 | Azuma et al. | .................. | 704/272 |
| 4,987,607 A * | 1/1991 | Gilbreath et al. | ............. | 398/119 |
| 5,363,221 A * | 11/1994 | Sutton et al. | ..................... | 359/11 |
| 5,410,147 A * | 4/1995 | Riza et al. | ............... | 250/214 LS |
| 5,473,696 A * | 12/1995 | van Breemen et al. | ....... | 713/162 |
| 5,629,802 A * | 5/1997 | Clark | ............................ | 359/573 |
| 5,726,804 A * | 3/1998 | Hait | .............................. | 359/577 |
| 5,835,590 A * | 11/1998 | Miller | ........................... | 380/266 |
| 5,864,625 A * | 1/1999 | Rutledge | ......................... | 380/31 |
| 5,867,290 A * | 2/1999 | Dutt et al. | ....................... | 398/43 |
| 6,018,582 A * | 1/2000 | Francois et al. | .............. | 380/256 |
| 6,226,113 B1 * | 5/2001 | Wolf | .............................. | 398/119 |
| 6,236,483 B1 * | 5/2001 | Dutt et al. | ..................... | 398/141 |
| 6,396,801 B1 * | 5/2002 | Upton et al. | .................. | 370/204 |
| 6,421,154 B1 * | 7/2002 | Diels et al. | .................... | 398/182 |
| 6,501,578 B1 * | 12/2002 | Bernstein et al. | ............. | 398/201 |
| 6,608,721 B1 * | 8/2003 | Turpin et al. | .................. | 359/577 |
| 6,683,955 B1 * | 1/2004 | Horne | .............................. | 380/34 |
| 6,791,734 B2 * | 9/2004 | Izadpanah | ..................... | 359/245 |
| 6,801,687 B2 * | 10/2004 | Pierce | ............................. | 385/28 |
| 6,934,475 B2 * | 8/2005 | Stappaerts | .................... | 398/121 |
| 7,002,127 B2 * | 2/2006 | Billman | ..................... | 250/201.9 |
| 7,099,590 B2 * | 8/2006 | Mays, Jr. | ....................... | 398/130 |
| 7,142,789 B1 * | 11/2006 | Weiner et al. | ................. | 398/201 |
| 7,283,751 B2 * | 10/2007 | Bruesselbach et al. | ........ | 398/119 |
| 7,315,557 B2 * | 1/2008 | Futami et al. | .................... | 372/25 |
| 7,324,755 B2 * | 1/2008 | Izadpanah | ....................... | 398/78 |
| 7,339,717 B2 * | 3/2008 | Peer et al. | ..................... | 359/326 |
| 7,546,038 B2 * | 6/2009 | Wang et al. | ..................... | 398/118 |
| 7,555,216 B2 * | 6/2009 | Yoshino et al. | ................. | 398/77 |
| 7,620,328 B2 * | 11/2009 | Toliver | .......................... | 398/188 |
| 7,720,226 B2 * | 5/2010 | Turpin | .......................... | 380/256 |
| 7,729,572 B1 * | 6/2010 | Pepper et al. | .................. | 385/27 |
| 7,729,616 B2 * | 6/2010 | Etemad et al. | .................. | 398/77 |
| 7,761,009 B2 * | 7/2010 | Bloom | .......................... | 398/120 |
| 7,773,882 B2 * | 8/2010 | Menendez | ......................... | 398/78 |
| 7,796,885 B2 * | 9/2010 | Dress et al. | ..................... | 398/66 |
| 7,894,725 B2 * | 2/2011 | Holman et al. | ............... | 398/201 |
| 8,000,476 B2 * | 8/2011 | Shimosato et al. | ........... | 380/260 |
| 8,078,059 B2 * | 12/2011 | Fuse | ............................. | 398/140 |
| 2002/0150242 A1 * | 10/2002 | Javidi et al. | ..................... | 380/54 |
| 2003/0067657 A1 * | 4/2003 | Dimmler et al. | .............. | 359/159 |

(Continued)

*Primary Examiner* — Agustin Bello

(57) ABSTRACT

A system comprises a laser configured to produce a laser beam; a modulator optically coupled to said laser; and a phase mask optically coupled to said modulator. The phase mask may be configured to pre-distort a pre-existing wavefront to produce a pre-distorted wavefront to be transmitted over free space.

25 Claims, 7 Drawing Sheets

U.S. PATENT DOCUMENTS

| | | | |
|---|---|---|---|
| 2004/0126116 A1* | 7/2004 | Dogariu | 398/130 |
| 2004/0161239 A1* | 8/2004 | Bruesselbach et al. | 398/131 |
| 2004/0264695 A1* | 12/2004 | Turpin | 380/200 |
| 2006/0193634 A1* | 8/2006 | Wang et al. | 398/118 |
| 2007/0122153 A1* | 5/2007 | Tamai | 398/77 |
| 2007/0242955 A1* | 10/2007 | Kavehrad | 398/130 |
| 2008/0107430 A1* | 5/2008 | Jackel | 398/188 |
| 2010/0329693 A1* | 12/2010 | Chen | 398/147 |

* cited by examiner

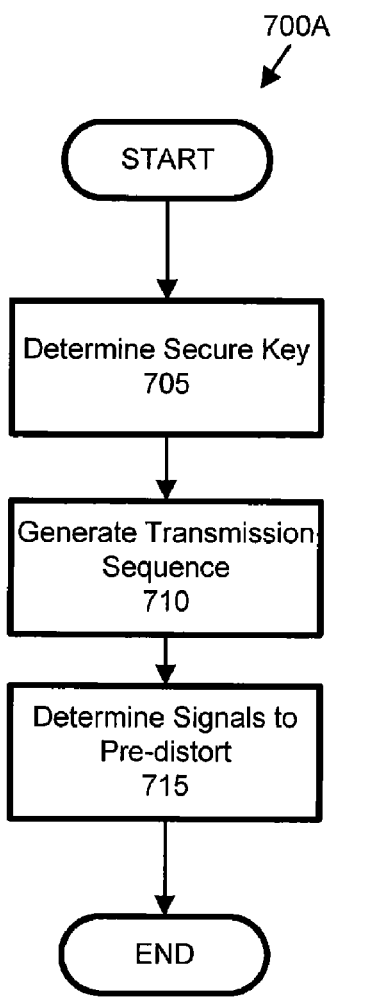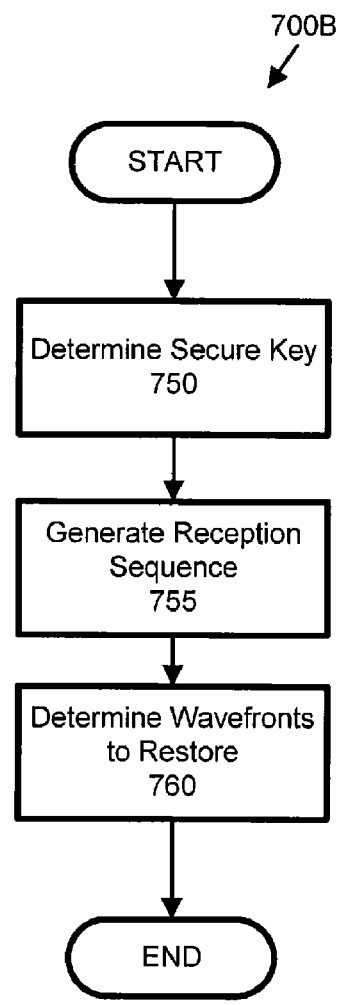
FIG. 7A
FIG. 7B

MULTICHANNEL ON A SINGLE WAVE LASER OVER WAVE DIVISION MULTIPLEXING IN FREE SPACE OPTICS USING PHASE MASKS

BACKGROUND

Free space optics may be used to selectively transmit data between two points where a wired connection may be impractical or impossible. Accordingly, it may be desirable to increase the security and bandwidth of free space optical systems.

BRIEF DESCRIPTION OF THE DRAWINGS

FIG. 7A illustrates an exemplary process providing further details regarding modulating signals onto corresponding beams.

FIG. 7B illustrates an exemplary process providing further details regarding decoding signals from received wavefronts.

DETAILED DESCRIPTION

Various optical communication technologies are in common use in modern telecommunications systems, including fiber optics and free space optics.

In fiber optics, light may be retained within a core layer of a fiber optic cable by total internal reflection, which causes the fiber to act as a waveguide. Generally, total internal reflection is an optical phenomenon that occurs when a ray of light strikes a medium boundary at an angle larger than a critical angle with respect to the normal to the surface. If the refractive index is lower on the far side of the boundary between two mediums, no light may pass through and the light may be reflected. Accordingly, a critical angle may be defined as a least angle of incidence at which total internal reflection occurs. Such a boundary may be formed, for example, between core and cladding layers of a fiber optic cable, allowing for light to propagate along the fiber. Thus, bound rays may enter the fiber optic cable at an angle greater than the critical angle, and may propagate along the axis of the fiber through the core due to total internal reflection.

However, in free space systems, wavefronts may be transmitted through the air from a transmitter 110 to a receiver 120, without the transmissions being enclosed in a wave guide. Thus, in free space optics, wavefronts are propagated without the use of a fiber optic cable. Instead, transmission from a transmitter 110 to a receiver 120 requires a clear line-of-sight path between the transmitter 110 and the receiver 120. Thus, to facilitate transmission, the transmitter 110 and receiver 120 are selectively positioned to face one another and form an information link.

When a free space transmission is made between the two points, phase and intensity fluctuations such as scintillations may be observed. These phase distortions may limit the performance of a free space optical system and may cause the system to perform poorly. In addition, exaggerated pre-determined phase distortions may be taken advantage of to increase the security and bandwidth of free space optical systems.

Figure 1:
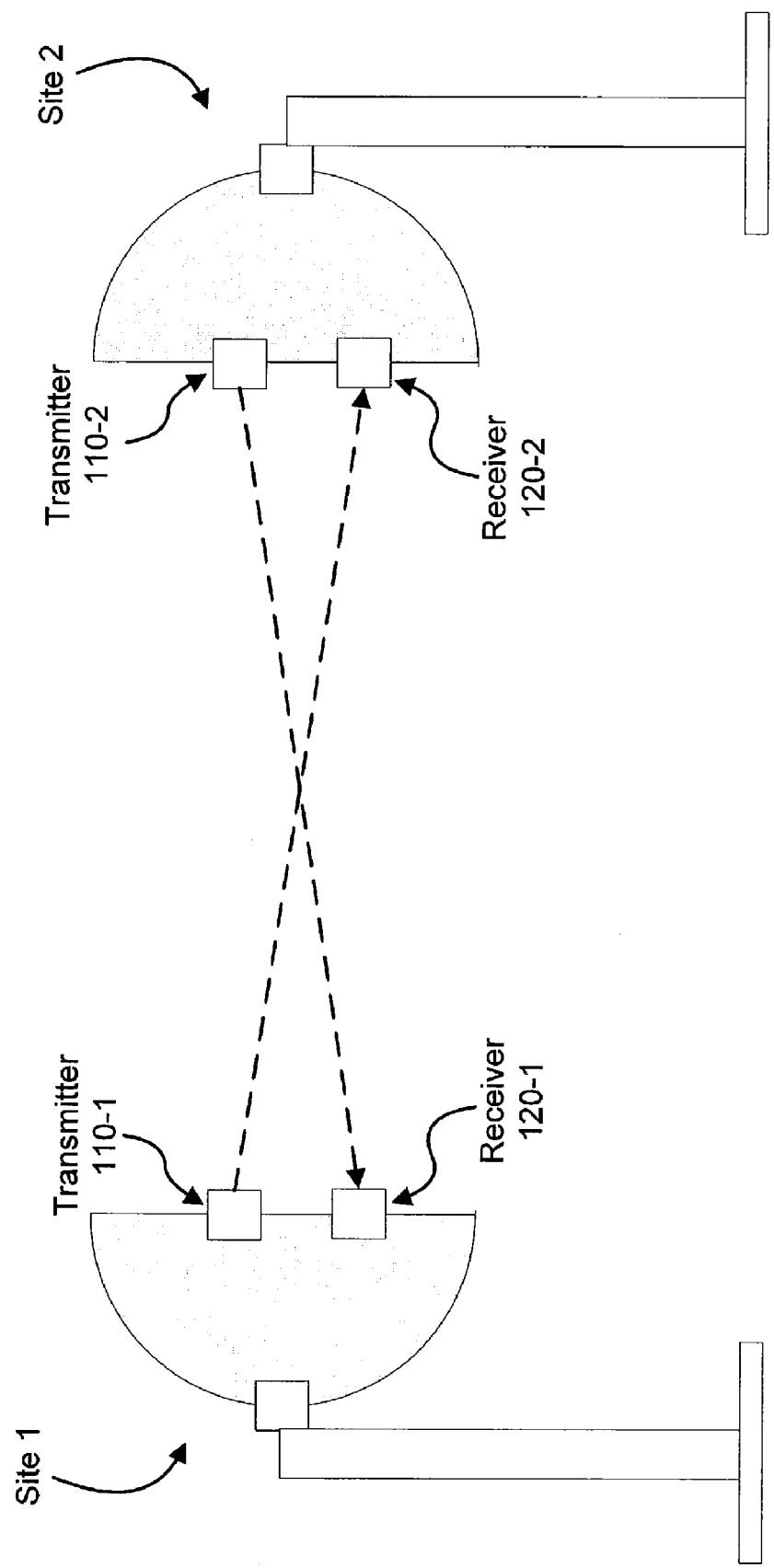
FIG. 1 illustrates an exemplary free space optical transmitter and receiver pair.

FIG. 1 illustrates an exemplary free space optical transmitter 110 and receiver 120 pair. As illustrated in FIG. 1, an exemplary transmitter 110-1 and receiver 120-1 pair are located at Site 1, and a transmitter 110-2 and receiver 120-2 are located at Site 2. Transmitter 110-1 located at Site 1 is specifically aligned and configured to be in selective communication with receiver 120-2 located at Site 2, while transmitter 110-2 located at Site 2 is specifically aligned and configured to be in selective communication with receiver 120-1 located at Site 1. Wavefronts at various wavelengths (e.g., visible light, infrared, etc.) may be transmitted by the transmitters 110-1 and 110-2 and may be received by the receivers 120-1 and 120-2 to allow for the transmission of data between the sites.

Although Site 1 and Site 2 are illustrated as each having only one transmitter 110 and one receiver 120, in many examples sites such as Site 1 and Site 2 may have multiple transmitters 110 and receivers 120. Moreover, although only two sites are illustrated in the figure, in other examples sites may be in selective communication with many other sites.

Wave division multiplexing (WDM) is a technology whereby multiple signals are multiplexed, transmitted over the same transmission medium, and de-multiplexed after transmission. In some examples, multiple wavelengths of light may be used to multiplex and de-multiplex the multiple signals. For example, with regard to fiber optics, a multiplexer may be used at a transmitter to join signals of various wavelengths together for transmission, and a demultiplexer may be used at a receiver to split the wavelengths back apart for further use. With regard to free space optics, through use of WDM, wavefronts at multiple wavelengths may be optically combined and simultaneously sent from a transmitter 110 and received at a receiver 120 over the same free space line-of-sight.

A WDM system may define a pre-set channel spacing across a frequency domain that may be used to define the wavelengths that are transmitted over the free space link. Accordingly, such a system may allow for the capacity of the free space link to be greatly expanded. For example, with regard to fiber optics, a coarse WDM system may provide for 16 transmission channels over C-band light wavelengths, while a dense WDM system may provide 40 channels with 100 GHz spacing or 80 channels with 50 GHz spacing. Similar systems may be in use over a free space link. Because multiple transmissions may be sent over the same free space link, a WDM system may greatly increase the throughput of a free space system.

Moreover, a WDM system may be implemented over free space using multiple transmissions over a single wavelength. Channel distribution may be achieved through use of pre-distorted wavefronts 240 and coupling with tunable phase masks 230 and conjugate phase masks 250 at the transmitter 110 and receiver 120, as opposed to through the use of multiple wavelengths and wavelength filters. Accordingly, unlike WDM systems that use multiple wavelengths to transmit multiple signals, through use of appropriate tunable phase masks 230 and conjugate phase masks 250, a system may be capable of transmitting multiple signals over free space using a single wavelength.

Figure 2:
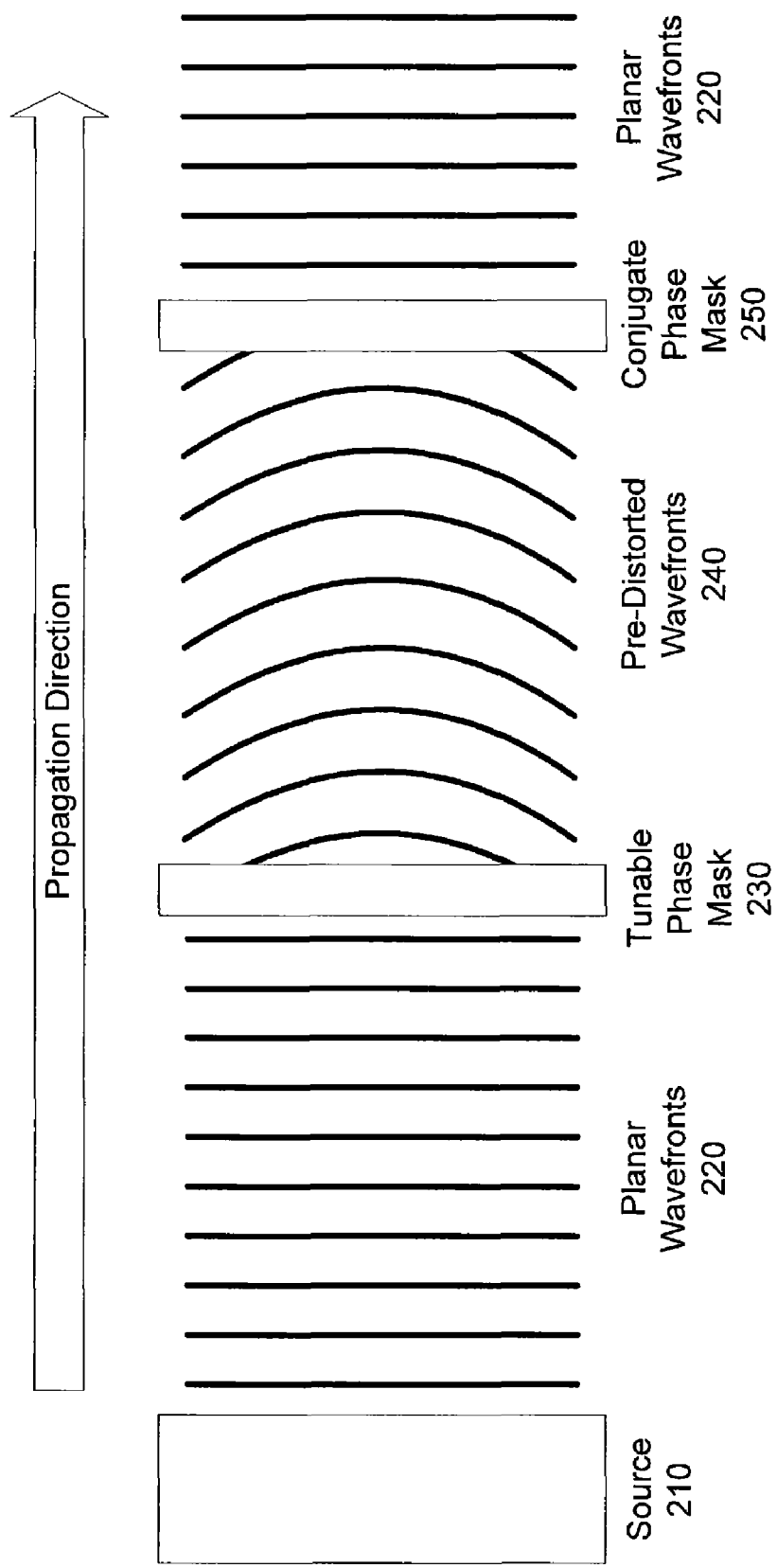
FIG. 2 illustrates exemplary phase masks configured for pre-distorting and restoring wavefronts.

FIG. 2 illustrates exemplary tunable phase masks 230 and conjugate phase masks 250 configured for pre-distorting and restoring wavefronts. A tunable phase mask 230 may be used to create a controlled distortion of pre-existing non-distorted wavefronts 220. The tunable phase mask 230 may further be tuned to change the parameters of the controlled distortion or to select from one of a plurality of controlled distortions. In the example, the pre-existing wavefronts are at least generally planar, but non-distorted. Likewise, a conjugate phase mask 250 may be used to reverse the controlled distortion.

Generally, an undistorted wavefront may be modeled as a flat slice of a light beam. For example, if one were to cut a beam of light perpendicular to the propagation direction and be able to view the end of the cut, the wavefront slice would appear as a plane. These are illustrated in the figure as planar wavefronts 220, which are further illustrated as traveling in a propagation direction away from a source 210.

A tunable phase mask 230 may be used to pre-distort a planar wavefront 220 into another shape. This pre-distortion may be performed prior to transmission of the wavefronts over free space. The wavefronts 220 may pass through tunable phase mask 230, and due to the design, particular settings, and tuning of the tunable phase mask 230, the wavefronts may accordingly be distorted in a controlled manner into pre-distorted wavefronts 240. Then, when these pre-distorted wavefronts 240 are propagated over free space, the distortion of the wavefront may be maintained. After transmission, a conjugate phase mask 250 may be used to correct the distortion made to the pre-distorted wavefronts 240. Thus, conjugate phase masks 250 may allow for the planar wavefronts 220 to be restored for decoding.

Although FIG. 2 illustrates a simple distortion performed on the wavefronts 220, phase mask pre-distortions may take multiple and more complex forms. For example, a tunable phase mask 230 may pre-distort a waveform according to a Gaussian pattern, or a double Gaussian pattern, or another simple or complex ripple pattern.

Further, multiple differently configured tunable phase mask 230 may be used to create multiple different pre-distorted wavefront 240 patterns. These different patterns of pre-distorted wavefronts 240 may be superimposed upon one another. The superimposed pre-distorted wavefronts 240 may be transmitted from a transmitter 110 to a receiver 120 simultaneously.

Figure 3:
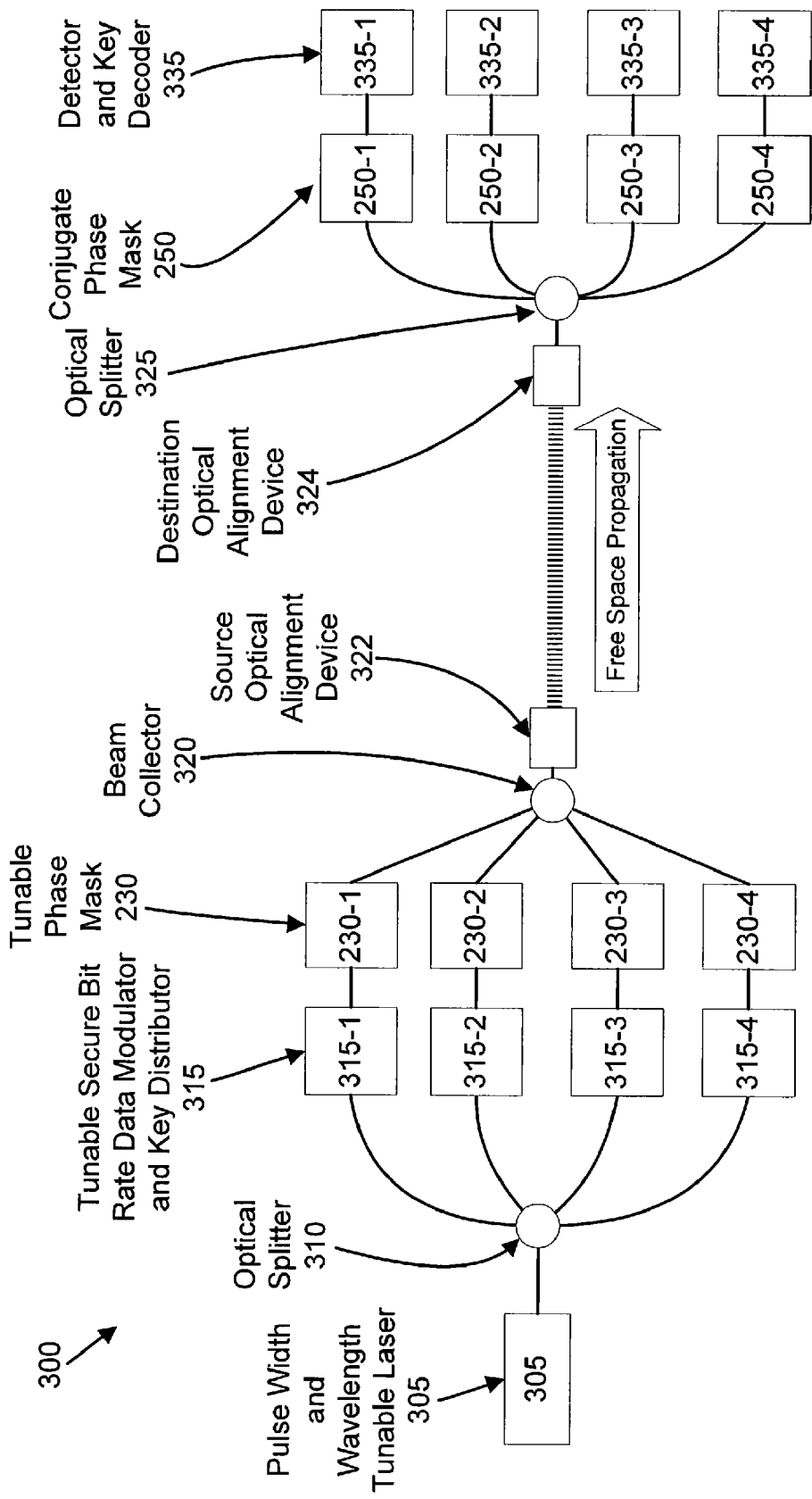
FIG. 3 illustrates an exemplary communications system for free space transmission of multiple pre-distorted wavefronts over a free space optical transmitter and receiver pair.

FIG. 3 illustrates an exemplary communications system 300 for free space transmission of multiple pre-distorted wavefronts 240 over a free space optical transmitter 110 and receiver 120 pair.

As illustrated in the figure, system 300 includes a single wavelength laser 305. A single wavelength laser 305 is a device that may emit light or other forms of electromagnetic radiation through simulated emission. A laser, such as single wavelength laser 305, may generally be a light source configured to provide a spatially coherent low-divergence beam of light energy for a particular band of wavelengths. Accordingly, single wavelength laser 305 may provide a beam of coherent light and function as a light source for system 300. For example, the single wavelength laser 305 may be a 1550 nm laser, a light-emitting diode (LED) laser, etc.

Laser 305 may additionally have a tunable pulse width. For example, laser 305 may have a pulse width tunable from approximately 50 femtoseconds to approximately 50 picoseconds. Longer or shorter pulses are possible, but the wavelength of the laser may impose a lower bound on the width in time of the pulse. If a laser pulse width is narrow in time, when the laser pulse shoots out into a transmission medium, the pulse may collapse upon itself and become a singularity. In contrast, if the pulse is wide, then the total intensity of the laser pulse may likewise be more distributed. With regard to a free space transmission, the pulse width of a laser beam may be manipulated to avoid absorption peaks in the free space. The manipulation may be performed to avoid different free space obstructions, including for example, fog, rain, or snow.

Laser 305 may be optically coupled to an optical splitter 310, such as through a fiber optic cable or through free space transmission. The optical splitter 310 may split the energy of a beam of light into multiple beams of light through energy divergence.

One or more tunable secure bit rate data modulator and key distributors (SDMKDs) 315 may be optically coupled to the optical splitter 310. Each SDMKD 315 may receive a data signal and may vary the amplitude and phase of a light beam to facilitate the transmission of the data signal over the light beam. SDMKD 315 may be used to modulate a beam comprising video, voice, data, secure keys, or any other form of data transmission. Additionally, SDMKD 315 may modulate the beam at a selected data rate, such as 2.5 Gbit/sec, 10 Gbit/sec, 40 Gbit/sec, among other data rates.

As illustrated in FIG. 3, system 300 includes four SDMKDs 315, namely 315-1, 315-2, 315-3, and 315-4, where each SDMKD 315 is optically coupled to optical splitter 310. Although FIG. 3 includes four SDMKDs 315, systems with more or fewer SDMKD 315 modulators are possible.

One or more signal feeds may be selectively coupled to each of the SDMKDs 315, and may be configured to provide data signals to be modulated onto the light beams by the SDMKDs 315. In some examples, the signal feeds provided to the SDMKDs 315 may be electronic signals, while in other examples the feeds may be provided as optical signals, radio-frequency signals, or by some other technology. Signal feeds may originate from a common signal feed or from multiple separate signal feed sources.

In some examples, each SDMKD 315 may receive a separate signal to modulate. For example, SDMKD 315-1 may modulate a first signal onto a light beam, SDMKD 315-2 may modulate a second signal onto a light beam, SDMKD 315-3 may modulate a third signal onto a light beam, and SDMKD 315-4 may modulate a fourth signal onto a light beam.

Additionally, each SDMKD 315 may use a different data modulation rate, even though each may be optically connected to the same laser 305. For example, SDMKD 315-1 may modulate data at 10 Gbit/sec, while SDMKD 315-2 may modulate data at 2.5 Gbit/sec.

Moreover, each SDMKD 315 may modulate a specified type of signal onto the beam. For example, SDMKD 315-1 may modulate a video signal, 315-2 may modulate a voice signal, 315-3 may modulate a data signal, and 315-4 may modulate a signal including secure keys information. In other instances, different types of signal may be modulated, or the same type of signal may be modulated by multiple SDMKD 315 devices. As another example, each of SDMKDs 315-1, 315-2, 315-3 and 315-4 may potentially modulate a different voice signal.

Tunable phase masks 230 may be optically coupled to each of the SDMKDs 315. As discussed above, a tunable phase mask 230 may be used to pre-distort a planar wavefront 220 into a pre-distorted wavefront 240. In some examples, tunable phase mask 230 may be constructed of a liquid crystal, a multi-dimensional liquid crystal, or a multi-dimensional lens specifically designed to cause an appropriate pre-distortion.

Tunable phase mask 230 may be designed using a computerized model of the desired pre-distortion. Thus, according to the model, tunable phase mask 230 may alter planar wavefronts 220 of a beam to correspond to the desired pre-distortion pattern. Accordingly, each tunable phase mask 230-1 through 230-4 may be used to cause a different predefined pre-distortion to the planar wavefront 220.

As illustrated, SDMKD 315-1 may be optically connected to tunable phase mask 230-1, SDMKD 315-2 may be optically connected to tunable phase mask 230-2, SDMKD 315-3 may be optically connected to tunable phase mask 230-3, and SDMKD 315-4 may be optically connected to tunable phase mask 230-4.

Beam collector 320 may be optically coupled to each of the tunable phase masks 230-1 through 230-4. For example, the light beam exiting each tunable phase mask 230 (or exiting a length of fiber optically connected to each tunable phase mask and acting as a transmission medium) may diverge at a standard divergence angle until collimated by the beam collector 230. Beam collector 320 may perform energy convergence with the multiple light beams carrying the modulated signals received from each of the tunable phase masks 230. Thus, beam collector 320 may output a combined light beam for transmission over free space, where the combined light beam includes each of the pre-distorted wavefronts 240 created by tunable phase masks 230-1 through 230-4 from the signals modulated by the SDMKDs 315-1 through 315-4.

The collimated light beam exiting beam collector 320 may be optically coupled to a source optical alignment device 322, such as a telescope. Source optical alignment device 322 may receive the combined collimated light beam from the beam collector 320, and may further condition the transmitted beam for transmission over free space to a destination optical alignment device 324. Source optical alignment device 322 may generally include suitable optics to make light parallel and to direct the transmission at an appropriate destination optical alignment device 324. Destination optical alignment device 324 may be within a line-of-sight of source optical alignment device 322, and generally may include optics configured to receive beams of various types. Destination optical alignment device 324 may accordingly receive the beam transmitted over free space from source optical alignment device 322, pass the received beam through an anti-reflective coating, and reduce the diameter of the received collimated beam using appropriate optics.

Destination optical alignment device 324 may further be optically connected to an optical splitter 325. Accordingly, destination optical alignment device 324 may forward the received transmission to an optical splitter 325. Optical splitter 325 may be configured to split the received transmission into multiple legs.

Conjugate phase masks 250 may each be optically coupled to a leg of optical splitter 325, and may be configured to receive a beam including multiple pre-distorted wavefronts 240. Each conjugate phase mask 250-1 through 250-4 may be configured to reverse one of the predefined pre-distortions performed by a tunable phase masks 230-1 through 230-4. For example, conjugate phase mask 250-1 may be may be configured to reverse the predefined pre-distortions performed by a tunable phase mask 230-1, conjugate phase mask 250-2 may be may be configured to reverse the predefined pre-distortions performed by a tunable phase mask 230-2, conjugate phase mask 250-3 may be may be configured to reverse the predefined pre-distortions performed by a tunable phase mask 230-3, and conjugate phase mask 250-4 may be may be configured to reverse the predefined pre-distortions performed by a tunable phase mask 230-4. Accordingly, conjugate phase masks 250-1 through 250-4 may reverse the pre-distortion of the pre-distorted wavefronts 240, allowing for each of the planar wavefronts 220 to be recreated.

Detector and key decoders (DKD) 335 may be optically coupled to conjugate phase masks 250. Each DKD may receive undistorted planar wavefronts 220, and may decode the planar wavefronts 220 into a resultant data signal, such as an electrical signal. For example, DKD 335-1 may be optically coupled to conjugate phase mask 250-1 and may decode a first beam of planar wavefronts 220, DKD 335-2 may be optically coupled to conjugate phase mask 250-2 and may decode a second beam of planar wavefronts 220, DKD 335-3 may be optically coupled to conjugate phase mask 250-3 and may decode a third beam of planar wavefronts 220, and DKD 335-4 may be optically coupled to conjugate phase mask 250-4 and may decode a fourth beam of planar wavefronts 220.

Accordingly, tunable phase masks 230 and conjugate phase masks 250 may be used for multiplexing and demultiplexing multiple signals using a single laser 305. Using exemplary system 300, greater throughput may be achieved than through use of a free space transmitter 110 and receiver 120 alone without tunable phase masks 230 and conjugate phase masks 250.

Moreover a system may use both tunable phase masks 230 and conjugate phase masks 250, and also multiple wavelengths. Use of multiple phase masks and also multiple wavelengths may allow for further increased bandwidth over a directed free space transmission.

Figure 4:
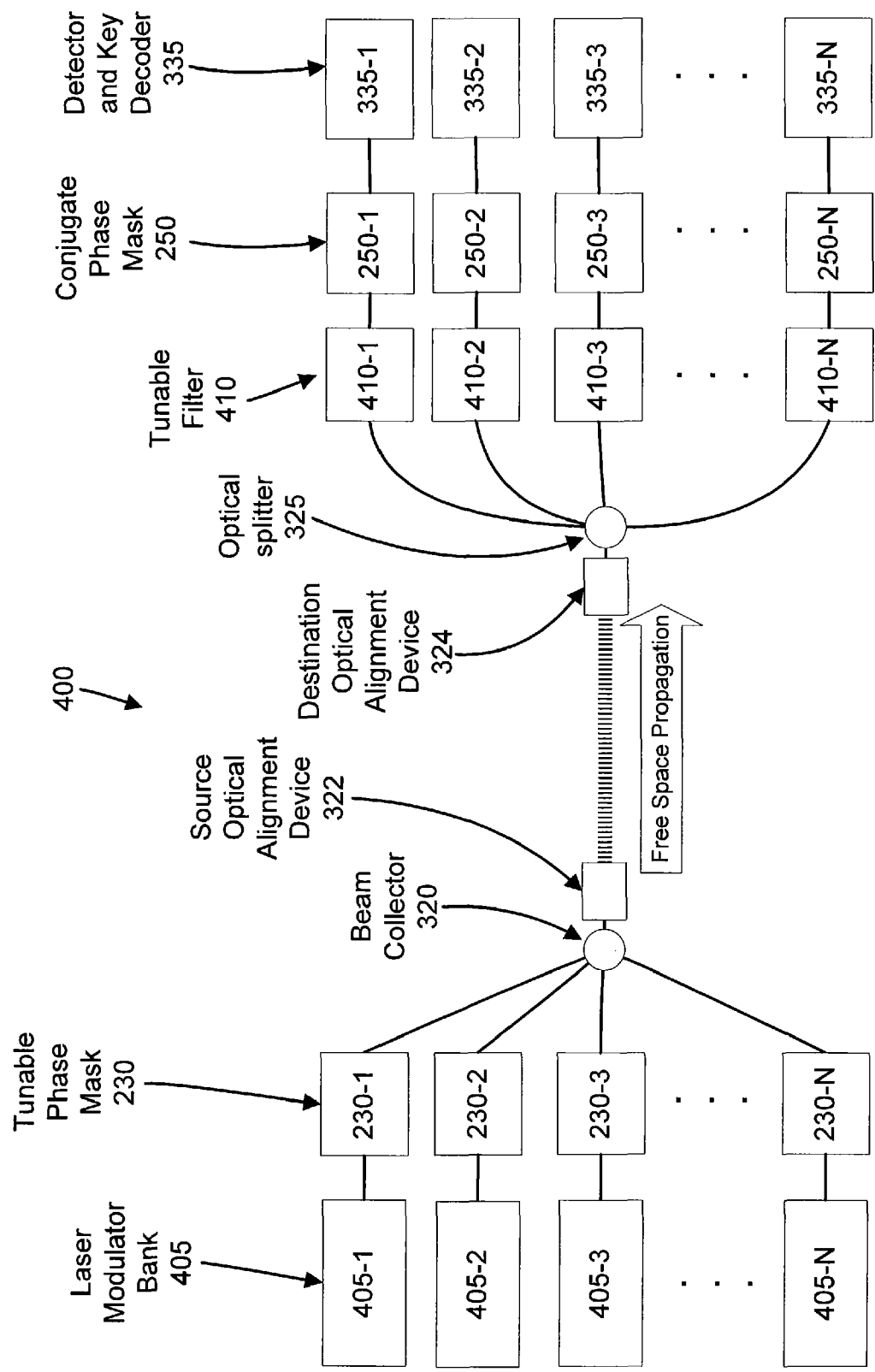
FIG. 4 illustrates an exemplary system including multiple lasers and configured for the propagation of multiple signals over multiple pre-distorted wavefronts and wavelengths.

FIG. 4 illustrates an exemplary system 400 including multiple lasers 305 and configured for the propagation of multiple signals over multiple pre-distorted wavefronts 240 and wavelengths.

As discussed above, WDM may be performed over free space using a single wavelength laser 305 and tunable phase masks 230 and conjugate phase masks 250, allowing for multiple signals to be propagated through free space through taking advantage of the different pre-distorted wavefronts 240. Accordingly, these multiple signals transmitted on the same wavelength may be though of as being "vertically" stacked. Moreover, multiple wavelengths of light may additionally be propagated through free space transmission from transmitter 110 to receiver 120, further increased the bandwidth of the free space system. Signals transmitted on different wavelengths may be though of as being "horizontally" stacked. Through use of both "vertically" and "horizontally" stacked signals, the theoretical bandwidth capacity of a free space transmission system may be further increased.

Exemplary system 400 shares many like numbered and similarly functioning elements with FIGS. 2 and 3. However, system 400 further includes a laser modulator bank 405 comprising multiple laser 405 elements, and corresponding tunable filter 410 elements to allow for "horizontally" stacked signals in addition to "vertically" stacked signals.

Each laser 405 in the laser bank may be a single wavelength laser or may be a tunable laser capable of tuning the laser output within a range or set of possible wavelengths. Each laser 405 may further comprise a modulator and support internal modulation. In other examples, each laser 405 may require an external modulator, such as SDMKD 315 (not shown in FIG. 4). The system 400 may comprise N lasers, numbered 1 through N, and each laser 405 may be any of the aforementioned laser types, including those discussed above with respect to laser 305. Moreover, each laser 405 may produce output on a different wavelength, or in the alternative, some or all lasers 405 may produce output on the same wavelength. For example, the laser bank may comprise a set of N lasers of N wavelengths, including a first laser of wavelength $\lambda_1$, a second laser of wavelength $\lambda_2$, ..., and an $N^{th}$ laser of wavelength $\lambda_N$. In other examples, the laser bank may comprise multiple lasers of the same wavelength, and/or one or more tunable lasers of variable selectable wavelength. To allow for "horizontally" stacked signals however, at least two of the lasers 405 should produce output on different wavelengths.

Similar to as discussed above, tunable phase masks 230-1 through 230-N may be optically coupled to lasers 405-1 through 405-N, respectively. Tunable phase masks 230-1 through 230-N may be configured to receive modulated signals and to pre-distort planar wavefronts 220 into pre-distorted wavefronts 240. Beam collector 320 may be optically coupled to tunable phase masks 230-1 through 230-N and also to a source optical alignment device 322, and may be configured to combine the plurality of modulated signals for transmission across free space to destination optical alignment device 324.

Destination optical alignment device 324 may be optically coupled to optical splitter 325. Optical splitter 325 may be configured to split a received signal modulated over a light beam into N legs, wherein each leg includes all the pre-distorted wavefronts 240 and wavelengths being propagated.

Each of tunable filters 410-1 through 410-N may be optically coupled to a leg of optical splitter 325. Each of tunable filters 410-1 through 410-N may be configured to allow for a specific wavelength of signal to pass. Thus, tunable filters 410 may allow for separation of different wavelengths in a similar manner to the aforementioned separation of the pre-distorted wavefronts 240 through use of conjugate phase masks 250.

Conjugate phase masks 250-1 through 250-N may be optically coupled to tunable filters 410-1 through 410-N, respectively. Additionally, each of conjugate phase masks 250-1 through 250-N and may be configured to reverse the pre-distortion performed by tunable phase masks 230-1 through 230-N. For example, conjugate phase masks 250-1 may reverse the pre-distortion performed by tunable phase mask 230-1, allowing for the planar wavefronts 220 sent from laser 305-1 to be recreated.

Conjugate phase masks 250-1 through 250-N may be optically coupled to DKDs 335-1 through 335-N, respectively. DKDs 335-1 through 335-N may thus each receive a beam including restored planar wavefronts 220 over a specific wavelength. Accordingly, DKDs 335-1 through 335-N may thus decode the restored planar wavefronts 220 over a specific wavelength into the originally transmitted signals.

Figure 5:
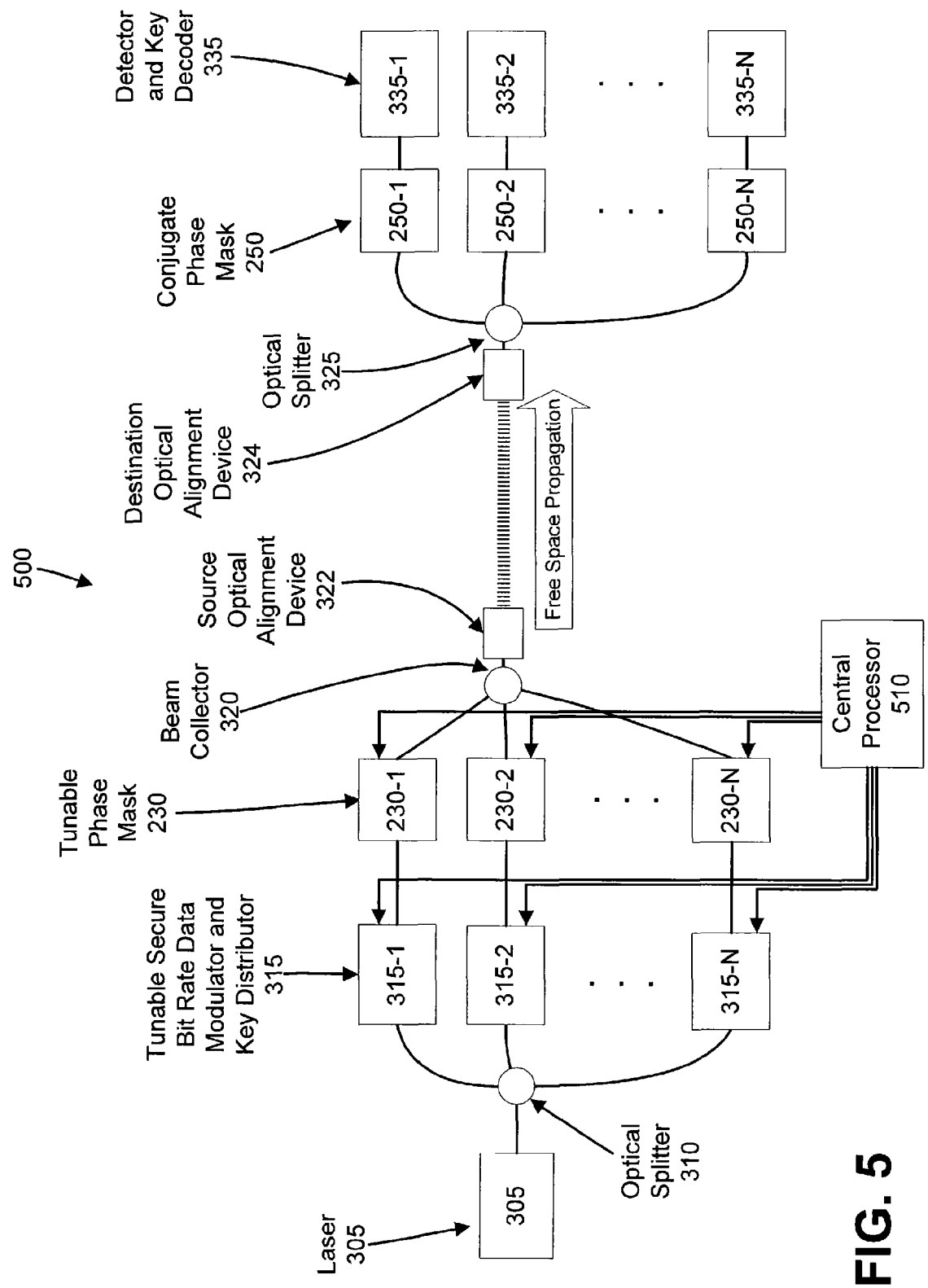
FIG. 5 illustrates an exemplary secure communications system including a central processor and configured to provide enhanced security features.

FIG. 5 illustrates an exemplary secure communications system 500 including a central processor 510 and configured to provide enhanced security features. Like numbered elements of exemplary system 500 previously discussed function similarly to as described above, with central processor 510 further providing an additional level of security.

For security purposes, the signals being transmitted over free space from source optical alignment device 322 to destination optical alignment device 324 may be dynamically switched among the various pre-distorted wavefronts 240. This dynamic switching may be accomplished through use of a central processor 510. Central processor 510 is a computing device that may be configured to direct each SDMKD 315 to modulate a particular defined data signal. Central processor 510 additionally or alternatively may be configured to tune or otherwise change the parameters of the controlled distortion created by each tunable phase mask 230. Accordingly, each SDMKD 315 and each tunable phase mask 230 may be in selective communication with central processor 510, and may be configured to receive and execute directives from central processor 510. For example, these directives may indicate to the SDMKD 315 which signal to modulate, or to switch from modulating one signal to modulating another. As further examples, these directives may indicate to the tunable phase mask 230 to select from one of a plurality of controlled distortions, or to change one or more parameters of the controlled distortion caused by the tunable phase mask 230. As each SDMKD 315 is optically coupled to a different tunable phase mask 230, the central processor 510 may direct the SDMKD 315 to switch signals and/or the tunable phase masks 230 to change distortions, and accordingly switch, change, and otherwise manipulate which pre-distorted wavefront 240 path over which a data signal may be modulated.

Through use of a mathematical random sequence generator, a secure key may be generated. The secure key may then be used by a mathematical function executed by central processor 510 to generate a particular sequence. This sequence may be used to selectively switch the signals among the possible pre-distorted wavefront 240 paths of transmission. This secure key may additionally be known at the receiver/decoder end (e.g., by the DKDs 335), and may be used to properly decode the signals.

In some examples, the secure key may be sent to the receiver/decoder end through one of the pre-distorted wavefront 240 paths. As with the other signals switched among the pre-distorted wavefront 240 paths, the secure key signal may additionally be switched from one path to another.

Although the secure key may potentially be intercepted over the free space transmission by a third party, because the secure key is transmitted over free space, any interception of the key would result in blocking of the free space transmission to the receiver 120. Accordingly, it is unlikely for the secure key to be intercepted by a third party without the receiver 120 end being alerted of the potential interception.

Because of the high security of the above-described WDN over free space systems, these systems may be well-suited for military applications as well as banking and other high security applications. Moreover, through use of the "vertical" WDM technique using a single wavelength, a laser with lower specifications may be utilized, as compared to the lasers that may be required for a multiple wavelength WDM system. Additionally, because the intended contours of the pre-distorted wavefronts 240 are known, digital signal processing and error correction may be possible to further increase the accuracy of signals sent across the free space system using pre-distorted wavefronts 240.

Figure 6:
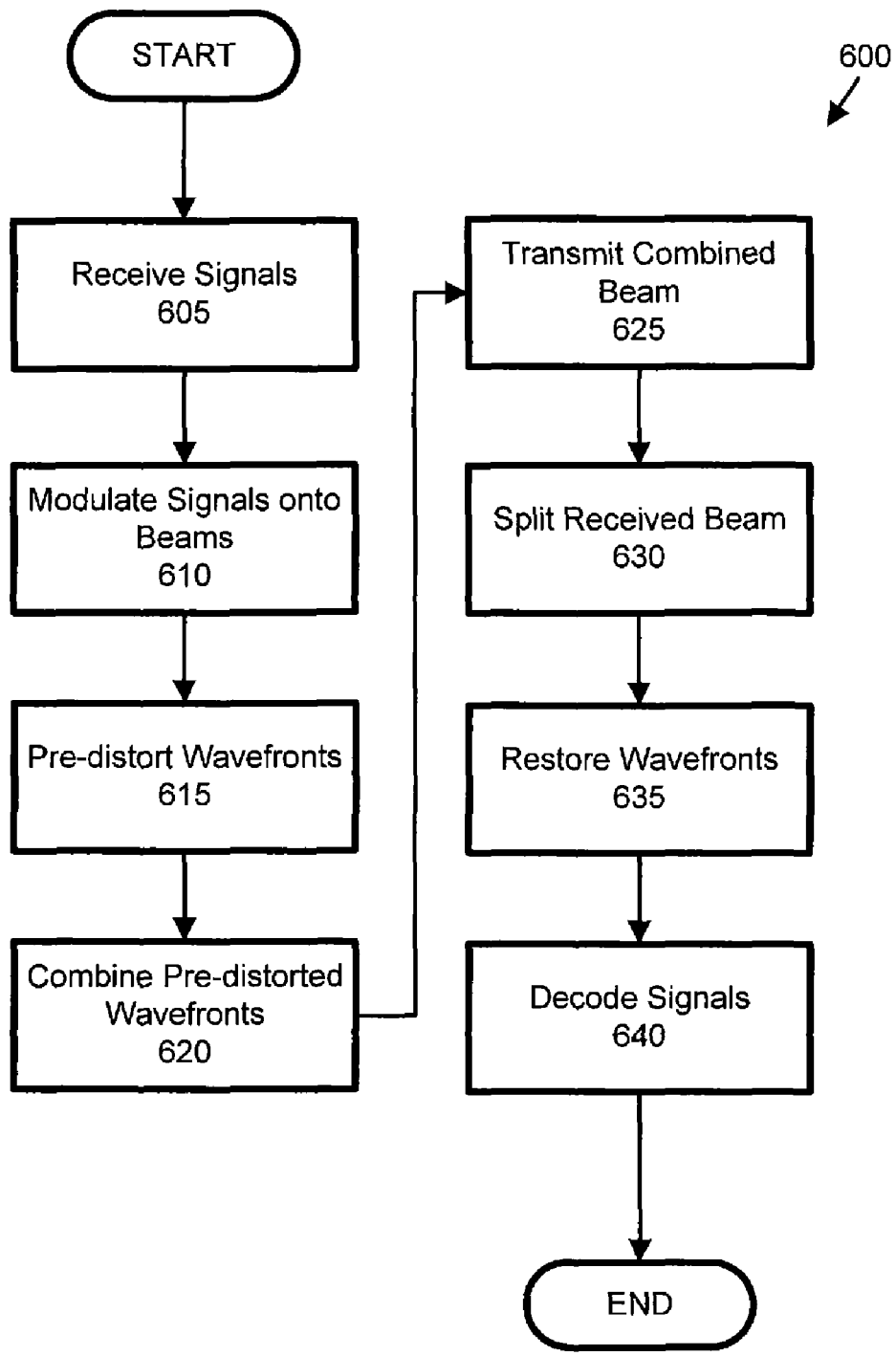
FIG. 6 illustrates an exemplary process for selectively multiplexing and transmitting multiple signals over free space using phase masks.

FIG. 6 illustrates an exemplary process 600 for selectively multiplexing and transmitting multiple signals over free space using phase masks. Process 600 may begin in step 605, wherein one or more signals are received by the system for transmission. For example, one or more signal feeds may carry a plurality of signals for transmission.

Next, in step 610, each SDMKD 315 modulates a signal onto a corresponding received light beam. For example, one or more of the signal feeds may be selectively coupled to each of a plurality of SDMKDs 315, wherein each SDMKD 315 may be used to modulate a specific signal onto a coherent light beam provided to the SDMKD 315 by a laser 305. In some instances some or all of the SDMKD 315 may receive light beams of the same wavelength, such as from multiple lasers of the same wavelength or from an optical splitter receiving a light beam from a laser 305 and outputting to multiple SDMKDs 315. Moreover, in some examples, the signal feeds provided to the SDMKDs 315 may be electronic signals, while in other examines the feeds may be provided as optical signals, radio-frequency signals, or by some other technology. Accordingly, each SDMKD 315 may modulate a signal onto the corresponding received light beam.

Next, in step 615, each beam is pre-distorted by a tunable phase mask 230. For example, a phase mask 230 may be optically coupled to each SDMKD 315, where each phase mask 230 may be specifically configured to pre-distort a pre-existing wavefront 220 into a pre-distorted wavefront 240. In some examples, each tunable phase mask 230 may be configured to cause a different predefined pre-distortion to the pre-existing wavefronts 220, allowing for the pre-distorted wavefronts 240 to be separable and distinguishable at the receiver end.

Next, in step 620, the pre-distorted wavefronts 240 are combined for transmission. For example, a beam collector 320 may be optically coupled to each of the tunable phase masks 230, where the beam collector 320 may perform energy convergence with the multiple light beams carrying the pre-distorted wavefronts 240 received from each of the tunable phase masks 230. Thus, beam collector 320 may output a combined light beam for transmission over free space, where the combined light beam includes each of the pre-distorted wavefronts 240 created by the phase masks from the signals modulated by the SDMKDs 315.

Next, in step 625, the combined beam is transmitted over free space optics. For example, a source optical alignment device 322 may receive the combined light beam from the beam collector 320, and may transmit the combined beam over free space to a destination optical alignment device 324. In some cases, the transmitted beam may include multiple signals carried over a single wavelength, while in other cases, multiple wavelengths of laser may be utilized. Additionally, the multiple signals modulated onto the beam may be of various bit rates, and may carry in part a sequential key.

Next, in step 630, the received beam is split for filtering and decoding. For example, an optical splitter 325 may be optically coupled to the destination optical alignment device 324 and may split the received beam into a plurality of legs, wherein each leg includes all the pre-distorted wavefronts 240 and wavelengths being propagated.

Next, in step 635, each split beam is passed through a phase mask to reverse the pre-defined wavefront distortion for decoding. For example, each leg of the optical splitter 325 may be optically coupled to a conjugate phase mask 250 corresponding to one of the selected pre-distorted wavefronts 240 being transmitted. In another exemplary approach, each conjugate phase mask 250 may be configured to reverse a predefined pre-distortion performed by a tunable phase mask 230. In approaches where multiple wavelengths of laser are being utilized, the plurality of conjugate phase masks 250 may further be coupled to tunable filters 355, to allow for filtering according to both a specific wavelength and pre-distorted wavefront to be decoded.

Next, in step 640, transmitted signals are decoded from the filtered and restored pre-existing wavefronts. For example, each conjugate phase mask 250 may be optically coupled to one of a plurality of DKD 335, wherein each signal for a filtered and restored wavefront may be individually decoded into an originally transmitted signal. Next, the process 600 ends.

FIG. 7A illustrates an exemplary process 700A providing further details of step 610 of process 600 regarding modulating signals onto corresponding beams.

In step 705, a secure key is determined. In one exemplary illustration, the secure key may be generated through use of a mathematical random sequence generator. In other examples, the secure key may be known without requiring a new secure key to be generated.

Next, in step 710, a transmission sequence is generated. For example, the secure key determined in step 705 may then be used by a mathematical function to generate a particular sequence. In some examples, the mathematical function may be executed by a central processor 510.

Next, in step 715, which signals to pre-distort are determined. For example, each SDMKD 315 may modulate a signal from among one or more signal feeds onto a corresponding received light beam. The transmission sequence generated in step 710 may be used to determine which signal or signals from the one or more signal feeds discussed above with regard to step 610 to modulate onto the corresponding beam for each SDMKD 315. Further, the transmission sequence may be used to selectively switch which signal from among one or more signal feeds to modulate onto the corresponding beam for each SDMKD 315. Accordingly, the plurality of signals may be selectively switched among the possible pre-distorted wavefront 240 paths of transmission. Next, process 700A ends.

FIG. 7B illustrates an exemplary process 700B providing further details of step 640 of process 600 regarding decoding signals from received wavefronts.

In step 750, a secure key is determined. In some examples, the secure key may be known by the receiver/decoder end. In other examples, the secure key may be sent to the receiver/decoder end through one of the pre-distorted wavefront 240 paths. As with the other signals switched among the pre-distorted wavefront 240 paths, the secure key signal may additionally be switched from one path to another.

Next, in step 755, a reception sequence is generated. For example, the secure key determined in step 750 may then be used by a mathematical function to generate the particular reception sequence. In some examples, one or more DKDs 335 may generate the reception sequence.

Next, in step 760, which wavefronts to restore as which signals is determined. As discussed above, the transmission sequence may be used to selectively switch which signal or signals from among one or more signal feeds to modulate onto the one or more corresponding beams. Similarly, the reception sequence may be used to determine which signal or signals from among the one or more signal feeds was modulated onto which received wavefronts. Through use of the reception sequence, the receiver end may properly determine which signal is carried by which wavefronts and may accordingly decode the received signals. Next, process 700B ends.

In general, computing devices may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
  a laser configured to produce a laser beam;
  a plurality of modulators, each optically coupled to said laser and configured to modulate one of a plurality of signals onto said laser beam;
  a plurality of phase masks, each optically coupled to a respective one of said plurality of modulators and configured to pre-distort a pre-existing wavefront to produce one of a plurality of pre-distorted wavefronts to be transmitted over free space; and
  a secure key transmitted over one of said plurality of modulated signals and configured to facilitate generation of a sequence according to which said plurality of modulated signals are switched among said plurality of pre-distorted wavefronts.

2. The system of claim 1, wherein at least one of said plurality of phase masks is configured to pre-distort said pre-existing wavefront according to one of a Gaussian pattern, and a double Gaussian pattern.

3. The system of claim 1, wherein said pre-existing wavefront is a generally planar wavefront.

4. The system of claim 1, further comprising:
  a free space source optical alignment device configured to transmit said plurality of pre-distorted wavefronts;
  a free space destination optical alignment device configured to receive said plurality of pre-distorted wavefronts from said source optical alignment device; and
  a second plurality of phase masks, each optically coupled to said free space destination optical alignment device;
  wherein said second plurality of phase masks is configured to reverse said pre-distortion performed on said planar wavefront to reproduce said planar wavefront from said plurality of pre-distorted wavefronts.

5. The system of claim 4, further comprising a plurality of decoders optically coupled to respective ones of said second plurality of phase masks, is each of said plurality of decoders configured to receive said laser beam and to decode one of said plurality of modulated signals.

6. A system, comprising:
  a laser;
  an optical splitter optically coupled to said laser and configured to split a laser beam received from said laser into a plurality of laser beams;
  a plurality of signal modulators optically coupled to said optical splitter, each said modulator configured to:
    receive a laser beam from said splitter and one of a plurality of signals to modulate, and
    modulate said one of said plurality of signals onto said laser beam;
  a plurality of phase masks, each said phase mask optically coupled to one of said plurality of signal modulators and configured to pre-distort a pre-existing wavefront to produce one of a plurality of pre-distorted wavefronts to be transmitted over free space; and a secure key transmitted over one of said plurality of modulated signals and configured to facilitate generation of a sequence according to which said plurality of modulated signals are switched among said plurality of pre-distorted wavefronts.

7. The system of claim 6, further comprising a beam collector, said beam collector being optically coupled to at least a subset of said plurality of phase masks and configured to perform energy convergence on said pre-distorted wavefronts received from said coupled phase masks and output a combined light beam.

8. The system of claim 7, further comprising:
a free space source optical alignment device optically coupled to said beam collector and configured to transmit said combined light beam comprising said plurality of pre-distorted wavefronts; and
a free space destination optical alignment device configured to receive said combined light beam from said transmitter.

9. The system of claim 8, further comprising a second optical splitter optically coupled to said free space destination optical alignment device and configured to receive said combined light beam and split said combined light beam into a plurality of legs.

10. The system of claim 9, wherein each said leg of said second optical splitter includes all of said plurality of pre-distorted wavefronts being propagated by said light beam.

11. The system of claim 9, further comprising a second plurality of phase masks, each of said second plurality of phase masks optically coupled to a leg of said plurality of legs and configured to reverse said pre-distortion performed on said planar wavefront to reproduce said planar wavefront from said plurality of pre-distorted wavefronts.

12. The system of claim 11, further comprising a plurality of decoders, wherein each said second phase mask is optically coupled to a decoder in said plurality of decoders, each of said decoders being configured to decode a corresponding one of said plurality of signals modulated on a received light beam into a resultant signal.

13. The system of claim 6, further comprising a central processor in selective communication with said plurality of signal modulators;
wherein said central processor is configured to issue directives to said signal modulators, said directives being determined at least in part according to said secure key; and
wherein each said signal modulator is configured to receive a directive from said central processor indicating which signal to modulate.

14. The system of claim 13, wherein said central processor is further configured to issue directives to said plurality of signal modulators to cause said plurality of signal modulators to selectively switch among modulated signals, thereby causing said signals to switch among said pre-distorted wavefronts.

15. A method, comprising:
modulating a first of a plurality of signals onto a first light beam to produce a first pre-existing wavefront, a second of said plurality of signals onto a second light beam to produce a second pre-existing wavefront, and a secure key onto a third light beam to produce a third pre-existing wavefront, the secure key facilitating generation of a sequence according to which the plurality of signals are switched among a plurality of pre-distorted wavefronts;

generating a transmission sequence according to the secure key used as an input to a mathematical function; and
determining which of said plurality of signals to modulate as said first signal and which of said plurality of signals to modulate as said second signal according to said transmission sequence;
pre-distorting said first pre-existing wavefront to produce a first pre-distorted wavefront and pre-distorting said second pre-existing wavefront to produce a second pre-distorted wavefront, and pre-distorting said third pre-existing wavefront to produce a third pre-distorted wavefront;
combining said first, second and third pre-distorted wavefronts into a combined beam for transmission; and
transmitting said combined beam by a transmitter.

16. The method of claim 15, further comprising:
receiving said combined beam from said transmitter;
splitting said received beam into a plurality of beams comprising a first beam and a second beam; and
reversing said pre-distortion performed on said first pre-existing wavefront to reproduce said first pre-existing wavefront, reversing said pre-distortion performed on said second pre-existing wavefront to reproduce said second pre-existing wavefront, and reversing said pre-distortion performed on said third pre-existing wavefront to reproduce said third pre-existing wavefront.

17. The method of claim 16, further comprising decoding said reproduced first pre-existing wavefront to reproduce at least a portion of said first of a plurality of signals, and decoding said reproduced second pre-existing wavefront to reproduce at least a portion of said second of a plurality of signals.

18. The method of claim 16, further comprising:
decoding said reproduced third pre-existing wavefront to reproduce said secure key;
generating a reception sequence according to said reproduced secure key used as an input to said mathematical function; and
determining which of said plurality signals to decode as said first signal and which of said plurality of signals to decode as said second signal according to said reception sequence.

19. The method of claim 15, wherein said transmission sequence is generated at least in part by a central processor in selective communication with a plurality of modulators, wherein a first of said plurality of modulators is configured to modulate said first signal onto said first light beam, wherein a second of said plurality of modulators is configured to modulate said second signals onto said second light beam, and further comprising directing said first modulator and said second modulator to switch signals by said central processor.

20. The method of claim 15, wherein said transmission sequence is generated at least in part by a central processor in selective communication with a plurality of phase masks, wherein a first of said plurality of phase masks is configured to pre-distort said first signal according to a first pre-distortion, wherein a second of said plurality of phase masks is configured to modulate said second signal onto said second light beam according to a second pre-distortion, and further comprising directing said first phase mask and said second phase mask to switch pre-distortion configurations by said central processor.

21. The method of claim 15, further comprising:
modulating a signal comprising an updated secure key onto said third light beam;
pre-distorting said third pre-existing wavefront to produce an updated third pre-distorted wavefront; and combining said third pre-distorted wavefront into said combined beam for transmission by said transmitter.

22. The method of claim 21, further comprising:

receiving said combined beam from said transmitter including said updated secure key;

decoding said third pre-distorted wavefront to reproduce said updated secure key;

generating an updated reception sequence according to said updated secure key used by said mathematical function; and determining which of said plurality signals to decode as said first signal and which to decode as said second signal according to said updated reception sequence.

23. The method of claim 15, further comprising selectively switching which of said plurality of signals is selected to be said first signal modulated onto said first light beam and which of said plurality of signals is selected as said second signal modulated onto said second light beam.

24. The method of claim 23, further comprising:

generating a sequence according to a secure key used by a mathematical function; and determining which of said plurality of signals to modulate as said first signal and which of said plurality of signals to modulate as said second signal according to said sequence.

25. The method of claim 24, wherein said steps of generating a sequence and determining which of said plurality of signals to modulate are performed at least in part by a central processor.

* * * * *